(12) United States Patent
Watanabe et al.

(10) Patent No.: US 12,515,734 B2
(45) Date of Patent: Jan. 6, 2026

(54) STEERING SYSTEM FOR VEHICLE

(71) Applicants: HONDA MOTOR CO., LTD., Tokyo (JP); THYSSENKRUPP PRESTA AKTIENGESELLSCHAFT, Eschen (LI)

(72) Inventors: Yoshinobu Watanabe, Tokyo (JP); Hayato Miyakawa, Tokyo (JP); Munetsugu Hanji, Tokyo (JP); Yosuke Ojima, Tokyo (JP); Imre Szepessy, Mauren (LI); Levente Pasztor, Budapest (HU); Peter Kakas, Budapest (HU)

(73) Assignees: HONDA MOTOR CO., LTD., Tokyo (JP); THYSSENKRUPP PRESTA AKTIENGESELLSCHAFT, Eschen (LI)

( * ) Notice: Subject to any disclaimer, the term of this patent is extended or adjusted under 35 U.S.C. 154(b) by 490 days.

(21) Appl. No.: 18/002,946

(22) PCT Filed: Mar. 2, 2021

(86) PCT No.: PCT/JP2021/007841
§ 371 (c)(1),
(2) Date: Dec. 22, 2022

(87) PCT Pub. No.: WO2022/185398
PCT Pub. Date: Sep. 9, 2022

(65) Prior Publication Data
US 2023/0264738 A1 Aug. 24, 2023

(51) Int. Cl.
*B62D 6/00* (2006.01)
*B62D 5/00* (2006.01)
*B62D 5/04* (2006.01)

(52) U.S. Cl.
CPC ............. *B62D 6/008* (2013.01); *B62D 5/006* (2013.01); *B62D 5/0469* (2013.01); *B62D 5/001* (2013.01)

(58) Field of Classification Search
CPC ...... B62D 6/008; B62D 5/006; B62D 5/0469; B62D 5/001
See application file for complete search history.

(56) References Cited

U.S. PATENT DOCUMENTS 5,796,248 A * 8/1998 Weber ..................... F02D 11/10
324/207.16
5,896,942 A * 4/1999 Bohner .................. B62D 5/005
180/444

(Continued)

FOREIGN PATENT DOCUMENTS

| JP | 2007153109 A | 6/2007 |
| JP | 2010023697 A | 2/2010 |

(Continued)

OTHER PUBLICATIONS

PCT International Search Report for Patent Application PCT/JP2021/007841 mailed Feb. 1, 2022; 4 pp.

(Continued)

*Primary Examiner* — Timothy Wilhelm
(74) *Attorney, Agent, or Firm* — Armstrong Teasdale LLP (57) ABSTRACT

Provided is a steer-by-wire steering system for a vehicle that can reduce or eliminate the impact noise generated by the rack at the rack end. A control unit of the steering system is configured to determine a target steered angle ($\alpha t$) according to the steering angle and drive the steering actuator so as to cause the steered angle to coincide with the target steered angle, and to determine a target reaction force (Tt) according to a steered state of the wheels and drive the reaction force actuator so as to cause the reaction force to coincide with the target reaction force. The control unit is further configured (Continued)

to set a maximum limit ($\alpha mC$) on the target steered angle, the maximum limit being a value smaller than a physical maximum steered angle ($\alpha mP$) of the wheels imposed by the steering mechanism.

7 Claims, 7 Drawing Sheets

(56) References Cited

U.S. PATENT DOCUMENTS

| | | | | |
|---|---|---|---|---|
| 5,931,256 | A * | 8/1999 | Langkamp | B62D 6/008 180/405 |
| 6,336,519 | B1 * | 1/2002 | Bohner | B62D 5/30 180/406 |
| 6,637,543 | B2 * | 10/2003 | Card | B62D 7/159 701/41 |
| 6,795,763 | B2 * | 9/2004 | Yao | B62D 6/008 701/44 |
| 6,847,177 | B1 * | 1/2005 | Gluch | H02K 29/06 318/567 |
| 7,034,483 | B2 * | 4/2006 | Takahashi | B62D 6/008 318/434 |
| 7,130,728 | B2 * | 10/2006 | Suzuki | B62D 6/008 180/413 |
| 7,595,577 | B2 * | 9/2009 | Niguchi | H02K 29/03 310/156.01 |
| 7,694,777 | B2 * | 4/2010 | Yamashita | B62D 5/0484 180/443 |
| 8,672,084 | B2 * | 3/2014 | Watanabe | B62D 7/1581 180/408 |
| 9,366,523 | B2 * | 6/2016 | Klimenko | F24S 20/69 |
| 9,623,900 | B2 * | 4/2017 | Yukitake | B62D 5/003 |
| 10,940,882 | B2 * | 3/2021 | Kim | B62D 5/006 |
| 10,953,912 | B2 * | 3/2021 | Rawlings | F16H 57/039 |
| 11,075,599 | B2 * | 7/2021 | Shiino | B62D 5/0463 |
| 11,167,793 | B2 * | 11/2021 | Hong | B62D 5/0469 |
| 11,780,493 | B2 * | 10/2023 | Shimizu | B60W 10/04 701/41 |
| 11,897,553 | B2 * | 2/2024 | Shin | B62D 5/0463 |
| 12,030,559 | B2 * | 7/2024 | Kakimoto | B62D 15/021 |
| 12,116,051 | B2 * | 10/2024 | Kakas | B62D 5/003 |
| 12,258,080 | B2 * | 3/2025 | Ojima | B62D 15/021 |
| 2001/0056317 | A1 * | 12/2001 | Nishizaki | B62D 6/003 701/41 |
| 2002/0189888 | A1 | 12/2002 | Magnus et al. | |
| 2004/0088093 | A1 * | 5/2004 | Yao | B62D 6/008 180/443 |
| 2006/0169519 | A1 * | 8/2006 | Osonoi | B62D 1/163 180/402 |
| 2007/0107974 | A1 * | 5/2007 | Ueno | H02K 21/14 180/444 |
| 2007/0168093 | A1 * | 7/2007 | Nishiyama | B62D 5/0466 701/41 |
| 2010/0168964 | A1 * | 7/2010 | Higashi | B62D 5/008 701/42 |
| 2011/0106382 | A1 | 5/2011 | Kageyama | |
| 2013/0138300 | A1 * | 5/2013 | Hayama | B62D 5/046 701/43 |
| 2014/0343697 | A1 * | 11/2014 | Kuipers | B60W 50/16 700/83 |
| 2021/0009197 | A1 | 1/2021 | Kim | |
| 2021/0009202 | A1 * | 1/2021 | Suzuki | B62D 6/002 |
| 2021/0016830 | A1 * | 1/2021 | Riese | B62D 6/008 |
| 2021/0070361 | A1 * | 3/2021 | Erickson | B62D 15/0235 |
| 2022/0185364 | A1 * | 6/2022 | Kwon | B62D 5/0406 |
| 2022/0410966 | A1 * | 12/2022 | Fujita | B62D 15/022 |
| 2023/0014650 | A1 * | 1/2023 | Kim | B62D 5/006 |
| 2023/0339534 | A1 * | 10/2023 | Sonoda | B62D 5/046 |

FOREIGN PATENT DOCUMENTS

| | | | |
|---|---|---|---|
| JP | 2014133521 | A | 7/2014 |
| JP | 2018131017 | A | 8/2018 |
| WO | 2019193976 | A1 | 10/2019 |
| WO | 2020115920 | A1 | 6/2020 |

OTHER PUBLICATIONS

Notice of Reasons for Refusal for Japanese Patent Application No. 2022-521095 dated Jun. 6, 2023; 8 pp.

* cited by examiner

STEERING SYSTEM FOR VEHICLE

CROSS-REFERENCE TO RELATED APPLICATION

This application is a U.S. National Phase Application of PCT/JP2021/007841, filed on Mar. 2, 2021. The content of this application is hereby expressly incorporated by reference in its entirety.

TECHNICAL FIELD

The present invention relates to a steer-by-wire steering system for a vehicle.

BACKGROUND ART

Known is a steer-by-wire steering system for a vehicle which includes a steering member such as a steering wheel configured to be operated by a vehicle operator, and a steering mechanism mechanically separated from the steering member and configured to change the steered angle of the wheels. The steering mechanism is driven by a steering actuator that generates a driving force to change the steering angle of the wheels. A reaction force actuator applies a reaction force to the steering member in response to the steering operation. In a previously proposed steer-by-wire steering system, the control unit causes the reaction force actuator to generate a reaction force when the vehicle speed is zero and the rotational angle of the steering wheel continues to be at a value corresponding to a rack end position of the steering mechanism for more than a prescribed time period. See Patent Document 1, for instance. According to this prior art, the control unit urges the vehicle operator to turn the steering wheel away from this angular position (the rack end position) by increasing the steering reaction to be greater than a normal value so that the load on the steering actuator may be reduced.

CITATION LIST

Patent Literature

[Patent Literature 1] JP2007-153109A

SUMMARY OF INVENTION

Technical Problem

According to the invention disclosed in Patent Document 1, the reaction force of the steering wheel does not become greater than usual until after the steering wheel has been operated to the rotational angle corresponding to the rack end position, and maintained for a prescribed time period. Therefore, when the steering wheel is operated with great force, the rack may create an impact sound at the rack end. In addition, the steering center of the steering wheel or the steering mechanism may deviate from a designed mechanical center due to dimensional errors in the component parts of the steering system, assembly errors at the time of factory assembly, the control actions of the control unit to aid the vehicle to travel straight ahead, alignment adjustments at the time of vehicle maintenance, etc. In such a case, the steering center may deviate from the designed mechanical center position. In such a case, the rack may collide with the rack end before the wheel steered angle reaches the design maximum steered angle. Thus, there is room for improvement.

In view of such a problem of the prior art, a primary object of the present invention is to provide a steer-by-wire steering system for a vehicle that can reduce or eliminate the impact noise generated by the rack at the rack end, and to allow the wheels to be steered to the design maximum steered angle even when the steering center of the steering wheel or the steering mechanism should deviate from a designed mechanical center.

Solution of Problem

To achieve such an object, the present invention provides a steering system (1) for a vehicle (2), comprising: a steering member (10) configured to receive a steering operation; a steering mechanism (11) mechanically separated from the steering member and including a rack that steers wheels via a movement thereof; a steering angle sensor (21) that detects a steering angle ($\beta$) of the steering member; a steered angle sensor (32) that detects a steered angle ($\alpha$) of the wheels; a steering actuator (12) configured to provide a drive force to the steering mechanism; a reaction force actuator (13) configured to apply a reaction force to the steering member in response to the steering operation; and a control unit (15) configured to determine a target steered angle ($\alpha t$) according to the steering angle ($\beta$) and drive the steering actuator so as to cause the steered angle ($\alpha$) to coincide with the target steered angle, and to determine a target reaction force (Tt) according to a steered state of the wheels and drive the reaction force actuator so as to cause the reaction force to coincide with the target reaction force, wherein the control unit is configured to set a control maximum steered angle ($\alpha mC$) on the target steered angle, the control maximum steered angle being a value smaller than a physical maximum steered angle ($\alpha mP$) of the wheels imposed by the steering mechanism.

By thus setting the target steered angle of the wheels to be a value smaller than the physical maximum steered angle, the rack is prevented from reaching the rack end even if the steering member is operated with great force so that impact noise is prevented from being generated. Furthermore, the wheels can be steered to the maximum steered angle or the design maximum steered angle even when the steering center of the steering wheel or the steering mechanism should deviate from a designed mechanical center.

Preferably, the control unit is configured to generate a steering limit reaction force (Tsl) that defines a maximum steering control limit angle ($\beta mC$) of the steering member corresponding to the control maximum steered angle.

Thus, when the steered angle of the wheels has reached to the maximum limit of the target steered angle, the steering limit reaction force is applied to the steering member so that the vehicle operator can be notified of the steered angle of the wheels reaching the control maximum steered angle ($\alpha mC$) from the reaction applied to the steering member.

Preferably, the steering system further comprises a physical stopper (43) that defines a physical maximum steering angle ($\beta mP$) of the steering member, the maximum steering control limit angle being smaller than the physical maximum steering angle ($\beta mC < \beta mP$).

Thereby, even in the case of a system failure, the physical stopper functions as a fail-safe measure that limits the rotation of the steering member. Under normal condition, since the maximum steering control limit angle is smaller than the physical maximum steering angle, even when the steering member is operated with great force toward the physical maximum steering angle by the vehicle operator, the steering limit reaction force is applied to the steering member in such a manner the steering member is prevented from colliding with the physical stopper.

Preferably, when the steered angle deviates from zero degree although the vehicle is traveling straight ahead, the control unit is configured to correct the prescribed relationship such that the current target steered angle corresponds to a zero steering angle position (the $\beta=0$ position) of the steering member.

Thus, when the steered angle deviates from zero degree although the vehicle is traveling straight ahead, the relationship between the target steered angle and the steering angle is corrected such that the vehicle travels straight ahead when the steering member is at the $\beta=0$ position.

Preferably, the control unit determines that the vehicle is traveling straight ahead according to a yaw rate ($\gamma$) of the vehicle.

The control unit may determine that the vehicle is traveling straight ahead when a yaw rate ($\gamma$) of the vehicle is substantially 0. Since the relationship between the target steered angle and the steering angle may be corrected when the yaw rate of the vehicle is substantially 0, and the vehicle is therefore traveling straight ahead, the vehicle operator is prevented from experiencing discomfort when traveling straight ahead.

Preferably, the control unit is configured to correct the prescribed relationship such that the control maximum steered angle ($\alpha mC$) is a same value in both steering directions.

Thus, the vehicle is caused to travel straight ahead when the steering member is at the $\beta=0$ position without requiring any change in the performance or the characteristics of the steering system.

Preferably, the control unit is configured to correct the prescribed relationship such that the control maximum steered angles in both steering directions ($\alpha mCL$, $\alpha mCR$) are changed to individual values without changing steered positions of the steering mechanism (11) corresponding to the control maximum steered angles ($\alpha mC$) in both steering directions.

Thereby, even though there may be a slight change in the performance or the characteristics of the steering system, it can be ensured that the vehicle travels straight ahead when the steering member is at the $\beta=0$ position.

Preferably, in changing the control maximum steered angles in both steering directions ($\alpha mCL$, $\alpha mCR$), the control unit changes the prescribed relationship in such a manner that the control maximum steering angles ($\beta mCL$, $\beta mCR$) in both steering directions are changed to individual values so as to correspond to changes in the control maximum steered angles ($\alpha mCL$, $\alpha mCR$).

Thereby, even though slight differences may be caused in the maximum values of the steering angle and the maximum values of the steered angles in the two steering directions, and the performance of the steering system may be thus slightly affected, the prescribed relationship can be corrected without causing any change in steering impression except for small angular ranges immediately preceding the limits of the steering range.

Preferably, in changing the control maximum steered angles in both steering directions ($\alpha mCL$, $\alpha mCR$), the control unit changes the prescribed relationship in such a manner that a gear ratio of the steered angle of the steered wheels to the steering angle of the steering member is changed differently between the two steering directions without changing the control maximum steering angle ($\beta mC$) of the steering member.

Thus, even though there is a slight difference in the way the wheels are steered between the two steering directions (increase/decrease in the steered angle), the prescribed relationship can be corrected without causing a change in the maximum steering angle.

Advantageous Effects of Invention

The present invention thus provides a steer-by-wire steering system for a vehicle that can reduce or eliminate the impact noise generated by the rack at the rack end, and allows the wheels to be steered to the design maximum steered angle even when the steering center of the steering wheel or the steering mechanism should deviate from a designed mechanical center.

DESCRIPTION OF EMBODIMENTS

Figure 1:
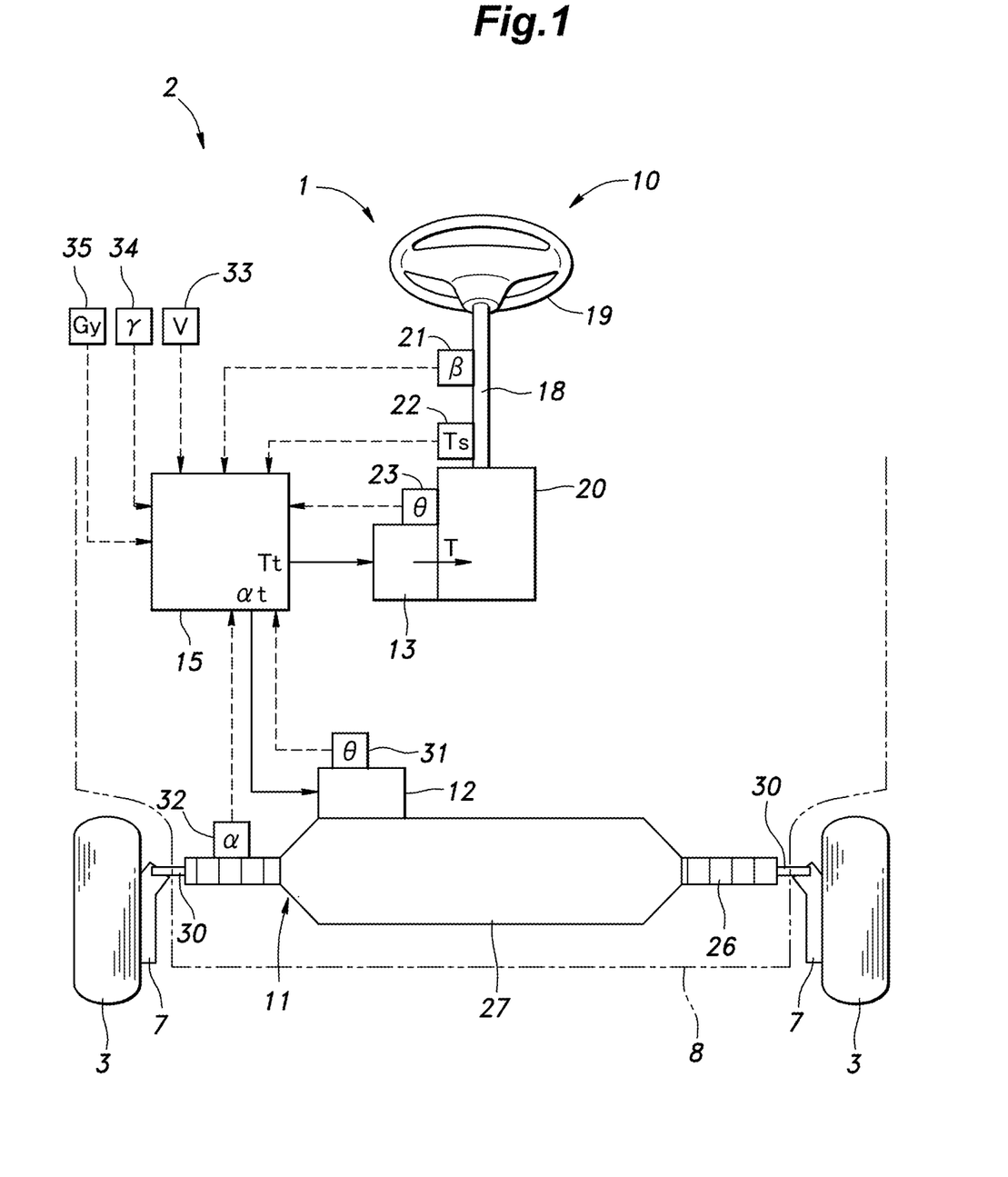
FIG. 1 is a schematic diagram of a steering system according to an embodiment of the present invention.

A steering system 1 for a vehicle 2 according an embodiment of the present invention is described in the following. As shown in FIG. 1, the steering system 1 consists of a steer-by-wire (SBW) steering system. The vehicle 2 fitted with the steering system 1 is a four-wheeled vehicle having left and right front wheels 3 and left and right rear wheels (not shown in the drawings). The left and right front wheels 3 are supported by a vehicle body 8 (only the outline of a lower part thereof is shown in FIG. 1) via respective knuckles 7 so that the steered angle $\alpha$ of the front wheels 3 can be changed, and the front wheels 3 thus serve as steerable wheels. The steered angle $\alpha$ refers to the angle of the front wheels 3 with respect to the fore and aft direction in plan view. The steering system 1 thus changes the steered angle $\alpha$ of the front wheels 3.

The steering system 1 includes a steering member 10 rotatably provided on the vehicle body 8, a steering mechanism 11 for steering the front wheels 3, a steering actuator 12 for applying a driving force to the steering mechanism 11, a reaction force actuator 13 that applies a reaction torque T to the steering member 10, and a control unit 15 that controls the reaction force actuator 13 and the steering actuator 12. The steering system 1 may be a redundant system that includes a plurality of sets each of which is provided with a steering actuator 12, a reaction force actuator 13, and a control unit 15.

The steering member 10 accepts a steering operation by the vehicle operator. The steering member 10 includes a steering shaft 18 rotatably supported by the vehicle body 8 and a steering wheel 19 provided at an end of the steering shaft 18. The steering shaft 18 is rotatably supported by a steering column 20 provided on the vehicle body 8, and has a rear end thereof projecting rearward from the steering column 20. The steering wheel 19 is connected to the rear end of the steering shaft 18 so as to rotate integrally with the steering shaft 18.

The reaction force actuator 13 consists of an electric motor which is connected to the steering shaft 18 via a gear mechanism. When the reaction force actuator 13 is driven, the driving force is transmitted to the steering shaft 18 as a rotational force. The reaction force actuator 13 applies a rotational torque to the steering member 10. The torque applied to the steering member 10 by the reaction force actuator 13 in response to the steering operation is called a reaction torque T.

The steering system 1 is further provided with a steering angle sensor 21 that detects the rotational angle of the steering shaft 18 around the central axis thereof as a steering angle $\beta$. The steering angle sensor 21 may be a per se known rotary encoder. Further, the steering system 1 is provided with a torque sensor 22 that detects the torque applied to the steering shaft 18 as a steering torque Ts. The torque sensor 22 detects the steering torque Ts applied to a part of the steering shaft 18 located between the steering wheel 19 and the reaction force actuator 13. The steering torque Ts is determined by the operating torque applied to the steering wheel 19 by the vehicle operator and the reaction torque T applied to the steering shaft 18 by the reaction force actuator 13. The torque sensor 22 may consist of a per se known torque sensor such as a magnetostrictive torque sensor or a strain gauge, or, alternatively, the steering torque may be estimated from the value of the electric current flowing through the electric motor of the reaction force actuator 13.

The steering system 1 further includes a first rotational angle sensor 23 that detects the rotational angle $\theta$ of the reaction force actuator 13. The first rotational angle sensor 23 may be a per se known resolver or rotary encoder.

The steering mechanism 11 has a rack 26 extending in the vehicle lateral direction. The rack 26 is supported by a gear housing 27 so as to be movable in the vehicle lateral direction. The left and right ends of the rack 26 are respectively connected to knuckles 7 that support the left and right front wheels 3 via respective tie rods 30. As the rack 26 moves in the vehicle lateral direction, the steered angle $\alpha$ of the front wheels 3 changes. The steering mechanism 11 is mechanically separated from the steering member 10.

The steering actuator 12 consists of an electric motor. The steering actuator 12 moves the rack 26 in the vehicle lateral direction according to the signal from the control unit 15, and changes the steered angle $\alpha$ of the left and right front wheels 3 accordingly.

The steering system 1 is further provided with a second rotational angle sensor 31 that detects the rotational angle $\theta$ of the steering actuator 12. The second rotational angle sensor 31 may be a per se known resolver or rotary encoder. Further, the steering system 1 has a steered angle sensor 32 that detects the steered angle $\alpha$ of the front wheels 3. In the present embodiment, the steered angle sensor 32 consists of a rack stroke sensor that detects the rack position (the position of the rack 26 along the lateral direction of the vehicle), and the steered angle $\alpha$ of the front wheels 3 is determined from the rack position.

The control unit 15 consists of an electronic control unit including a CPU, memory, a storage device for storing a program, and the like. The steering angle sensor 21, the torque sensor 22, the first rotational angle sensor 23, the second rotational angle sensor 31, and the steered angle sensor 32 are connected to the control unit 15. Based on the signals from these sensors, the control unit 15 acquires signals corresponding to the steering angle $\beta$, the steering torque Ts, the rotational angle $\theta$ of the reaction force actuator 13, the rotational angle $\theta$ of the steering actuator 12, and the steered angle $\alpha$. Further, the control unit 15 is connected to a vehicle speed sensor 33, a yaw rate sensor 34, and a lateral acceleration sensor 35, and acquires signals corresponding to the vehicle speed V, the yaw rate $\gamma$, and the lateral acceleration Gy.

The control unit 15 is connected to the reaction force actuator 13 and the steering actuator 12 to control the reaction force actuator 13 and the steering actuator 12. The control unit 15 controls the steering actuator 12 according to the steering angle $\beta$, and controls the reaction force actuator 13 according to the steered angle $\alpha$.

A mode of control action of the control unit 15 in the SBW mode is discussed in the following. The control unit 15 computes the target steered angle $\alpha t$ according to the steering angle $\beta$ detected by the steering angle sensor 21. The control unit 15 may compute the target steered angle $\alpha t$ by, for example, multiplying the steering angle $\beta$ by a predetermined gear ratio K ($\alpha t = \beta \times K$). The gear ratio K may be preferably 0.01 to 0.5, and may be more preferably 0.125. The control unit 15 computes a first current value A1 to be supplied to the steering actuator 12 according to the deviation $\Delta\alpha$ ($= \alpha t - \alpha$) between the target steered angle $\alpha t$ and the actual steered angle $\alpha$ so that the steered angle $\alpha$ coincides with the target steered angle $\alpha t$. Thus, the control unit 15 performs a feedback control of the steering actuator 12 according to the deviation $\Delta\alpha$. With an increasing deviation $\Delta\alpha$, the first current value A1 supplied to the steering actuator 12 is increased, the output of the steering actuator 12 is increased, and the amount of change in the steered angle $\alpha$ is increased.

The control unit 15 computes the target reaction torque Tt to be generated in the reaction force actuator 13 according to the steering state of the front wheels 3 in particular according to the deviation $\Delta\alpha$. The target reaction torque Tt may be computed by multiplying $\Delta\alpha$ by a predetermined coefficient. Then, the control unit 15 computes a second current value A2 to be supplied to the reaction force actuator 13 according to the computed target reaction torque Tt. The second current value A2 to be supplied to the reaction force actuator 13 may be determined in relation with the target reaction torque Tt by referring to a predetermined map. Alternatively, the control unit 15 may determine the second current value A2 according to the deviation $\Delta\alpha$ by referring to a predetermined map. The target reaction torque Tt and the second current value A2 are each greater in value as the deviation $\Delta\alpha$ of the steered angle $\alpha$ increases.

The control unit 15 supplies the second current value A2 to the reaction force actuator 13, and generates a corresponding driving force in the reaction force actuator 13. The driving force generated by the reaction force actuator 13 is applied to the steering shaft 18 as a reaction torque T that opposes the operation input of the vehicle operator. As a result, the vehicle operator can receive a reaction force (resistance force) against the steering operation applied to the steering wheel 19.

Figure 2:
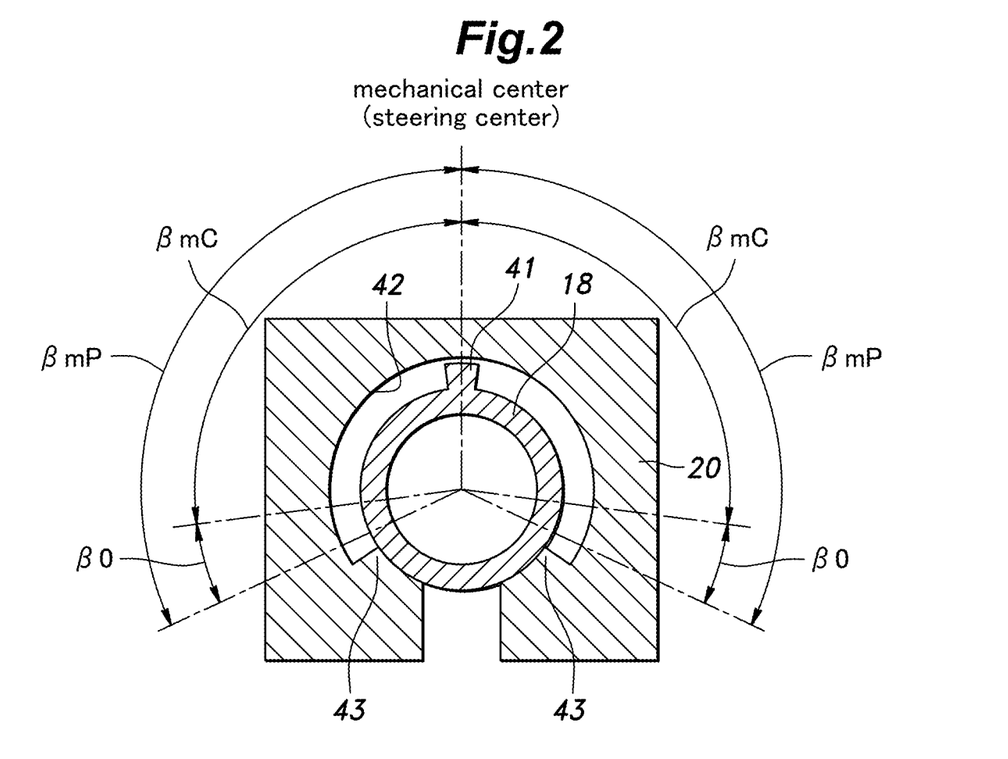
FIG. 2 is a simplified cross sectional view of a steering member.

FIG. 2 is a schematic cross-sectional view of the steering member 10. As described above, the steering shaft 18 is rotatably supported by the steering column 20. As shown in FIG. 2, a protrusion 41 is formed on the outer surface of the steering shaft 18, and a receiving groove 42 for receiving the protrusion 41 is formed on the steering column 20. The receiving groove 42 is formed on the inner periphery of the steering column 20 over an angular range smaller than 360 degrees, and the end walls defining the respective ends of the receiving groove 42 form physical stoppers 43 that limit the movement of the protrusion 41.

When the steering wheel 19 is turned clockwise, the protrusion 41 eventually comes into contact with the physical stopper 43 on the right side that defines a physical maximum steering angle $\beta mP$ in the clockwise rotation of the steering member 10. Conversely, when the steering wheel 19 is turned counter-clockwise, the protrusion 41 eventually comes into contact with the physical stopper 43 on the left side that defines a physical maximum steering angle $\beta mP$ in the counter-clockwise rotation of the steering member 10. The middle point between these two physical maximum steering angles $\beta mP$ in the clockwise rotation and the counter-clockwise rotation is a mechanical center of the steering member 10.

Similar physical limits are provided for the front wheels 3 or, in particular, to the steering mechanism 11. The front wheels 3 are allowed to be steered only to a physical maximum steered angle $\alpha mP$ in each direction. The physical maximum steered angle $\alpha mP$ may be defined in various ways, but is typically defined as a stroke end of the steering mechanism 11 which is generally referred to as a "rack end". The middle point between these two stroke ends in the clockwise rotation and the counter-clockwise rotation is a mechanical center of the steering mechanism 11 which is generally the position of the front wheels 3 when the vehicle 2 is traveling straight ahead, or a steered center of the steering mechanism 11 when the steered angle $\alpha$ is zero degree. The physical maximum steering angle $\beta mP$ may correspond to the physical maximum steered angle $\alpha mP$ ($\alpha mP = \beta mP \times K$). When the front wheels 3 are steered to the rack end, an impact noise is generated and a mechanical durability of the steering mechanism 11 is deteriorated by the impact. Such a noise and a deterioration of durability is desired to be avoided.

According to the present embodiment, a control maximum steering angle $\beta mC$ of the steering member 10 is set in each rotational direction at an angle preceding the physical maximum steering angle $\beta mP$ by an angle $\beta 0$. In computing the target steered angle $\alpha t$ according the steering angle $\beta$, as the steering angle $\beta$ is increased, the steered angle $\alpha$ of the front wheels 3 is increased in a corresponding manner. However, once the steering angle $\beta$ is increased beyond the control maximum steering angle $\beta mC$, the command to the steering actuator 12 is limited to a control maximum steered angle $\alpha mC$ corresponding to the control maximum steering angle $\beta mC$. In other words, when the steering member 10 is turned beyond the control maximum steering angle $\beta mC$, the front wheels 3 are steered only to the control maximum steered angle $\alpha mC$. The control maximum steered angle $\alpha mC$ is smaller than the physical maximum steered angle $\alpha mP$ by $\alpha 0$. Again, $\alpha mC = \beta mC \times K$, and $\alpha 0 = \beta 0 \times K$.

The reaction torque T that is applied to the steering member 10 is normally controlled so as to increase in dependence on the deviation $\Delta \alpha$ in the steered angle $\alpha$ from the target steered angle $\alpha t$. However, when the steering angle $\beta$ is equal to or greater than the control maximum steering angle $\beta mC$, the control unit 15 applies a steering limit reaction torque Tsl to the steering member 10 to prevent the steering member 10 from being turned beyond the control maximum steering angle $\beta mC$. The steering limit reaction torque Tsl is a value substantially greater than the normal value of the reaction torque T that could be generated in other situations. The control unit 15 computes a second current value A2 that is required to be supplied to the reaction force actuator 13 to generate the steering limit reaction torque Tsl.

Thus, once the steering angle $\beta$ of the front wheel 3 reaches the control maximum steering angle $\beta mC$, and hence the steered angle $\alpha$ of the front wheels 3 reaches the control maximum steered angle $\alpha mC$, the steering limit reaction torque Tsl is applied to the steering member 10 as a reaction torque T. As a result, the vehicle operator can recognize that the steered angle $\alpha$ of the front wheels 3 has reached the maximum degree from the reaction force received from the steering member 10, and is urged not to excessively turn the steering member 10.

Figure 4:
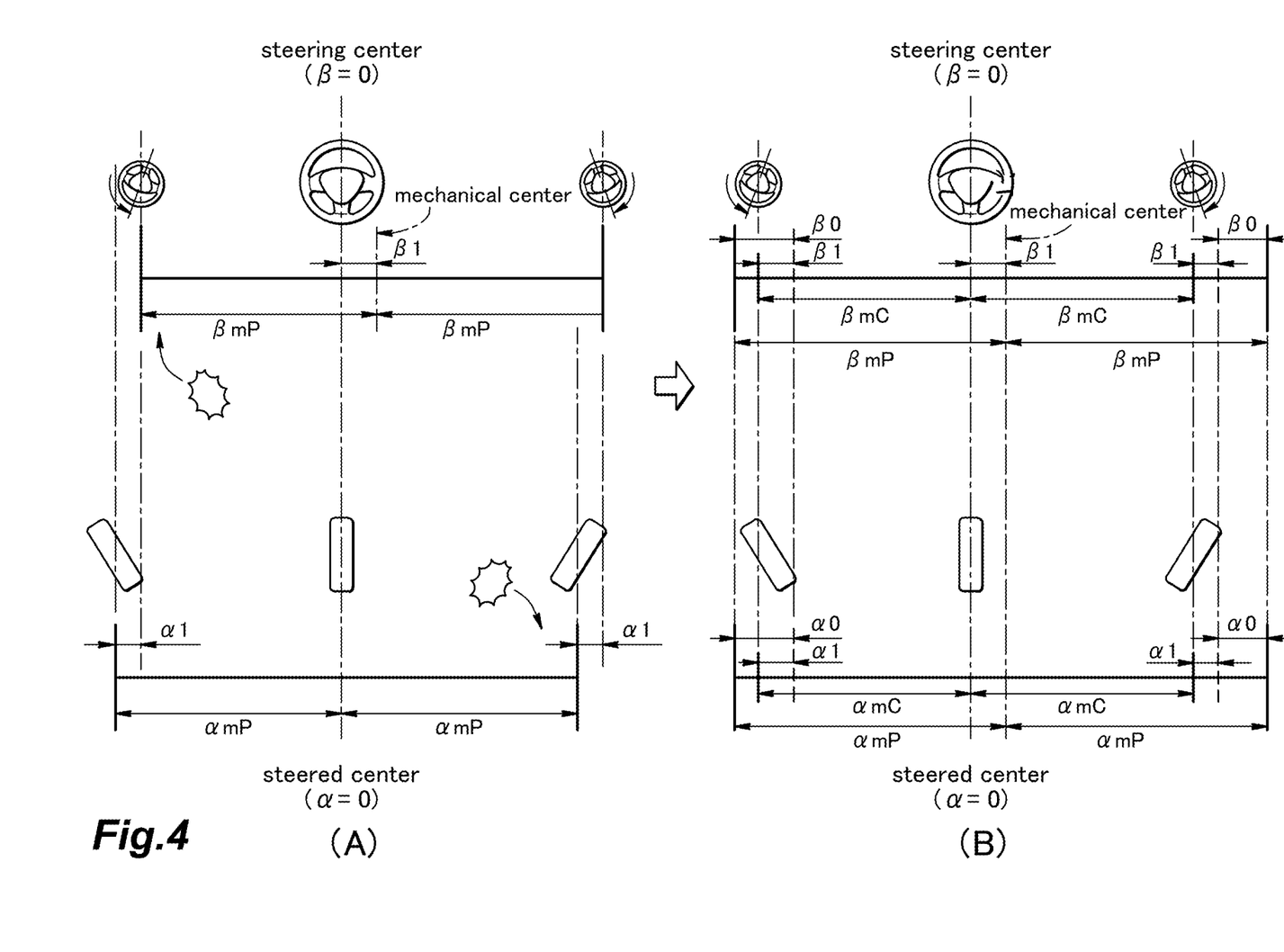
FIGS. 4A and 4B are schematic diagrams illustrating an example of the relationship between the steering angle of a steering member and the steered angle of the front wheels.
Figure 5:
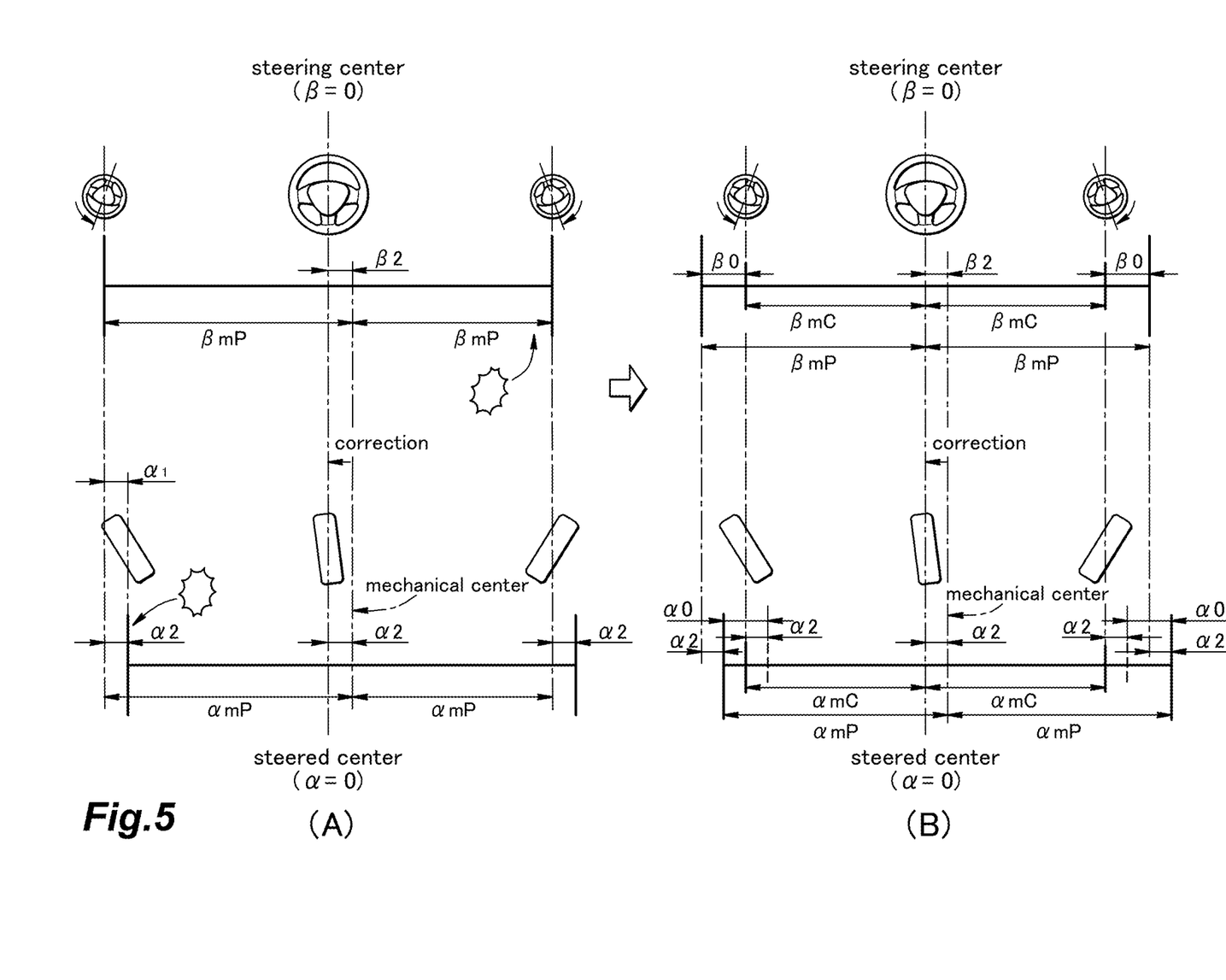
FIGS. 5A and 5B are schematic diagrams illustrating another example of the relationship between the steering angle of a steering member and the steered angle of the front wheels.

The relationship between the steering angle $\beta$ of the steering member 10 and the steered angle $\alpha$ of the front wheels 3 is discussed in the following in a more concrete fashion with reference to FIGS. 3 to 5.

Figure 3:
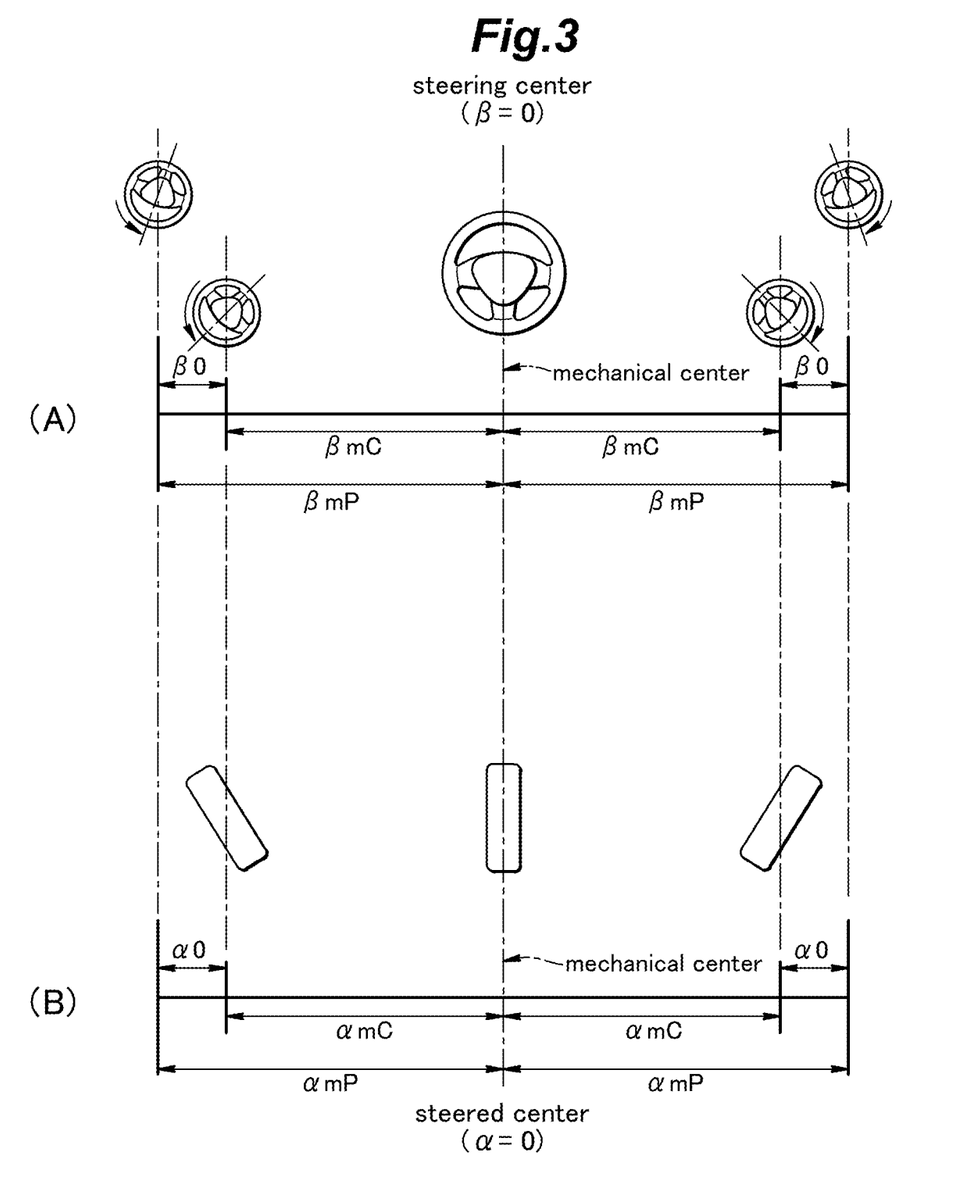
FIG. 3 is a schematic diagram illustrating an example of a relationship between the steering angle of a steering member and the steered angle of the front wheels.

FIG. 3 is a diagram showing an example of the relationship between the steering angle $\beta$ of the steering member 10 and the steered angle $\alpha$ of the front wheels 3. As shown in FIG. 3, when assembling the vehicle 2 at the factory, the steering member 10 is assembled so that the steering center of the steering member 10 at which the steering angle $\beta$ is zero degree corresponds to the mechanical center thereof. Here, the "steering center" means the nominal center or the designed center of the steering member 10. Therefore, the angular range of the steering member 10 is symmetric about the steering center. The steering member 10 may be turned from the steering center to either direction until a steering end is reached (which may be defined by a mechanical stop). Similarly, the front wheels 3 (the steering actuator 12) has the steered center which is the nominal center or the designed center of the steering mechanism 11, and the front wheels 3 can be steered from the steered center to either direction until a steered end is reached (which may be defined by a mechanical stop generally referred to as a "rack end"). The steering mechanism 11 is assembled so that the steered center of the steering mechanism 11 at which the steered angle $\alpha$ is zero degree corresponds to the mechanical center thereof.

Further, according to the present embodiment, since the steered angle $\alpha$ of the front wheels 3 is prevented from exceeding the control maximum steered angle $\alpha mC$ by the steering limit reaction torque Tsl, and the control maximum steered angle $\alpha mC$ is smaller than the physical maximum steered angle $\alpha mP$ by the angle $\alpha 0$, the steering mechanism 11 is prevented from being driven to the rack end so that even when the steering member 10 is turned forcibly, generation of impact noises from the steering mechanism 11 can be avoided. The physical stopper 43 for the steering member 10 is optional, and may also be omitted. However, in case of a failure in the steering system 1, the physical stopper 43 functions as a fail-safe measure that limits the rotation of the steering member 10.

FIGS. 4A and 4B are diagrams illustrating different examples of the relationship between the steering angle $\beta$ of the steering member 10 and the steered angle $\alpha$ of the front wheels 3. FIG. 4A shows the case where the physical maximum steering angle $\beta mP$ and the physical maximum steered angle $\alpha mP$ are provided, but the control maximum steering angle $\beta mC$ and the control maximum steered angle $\alpha mC$ are not provided. FIG. 4B shows the case where the control maximum steering angle $\beta mC$ and the control maximum steered angle $\alpha mC$ are provided in addition to the physical maximum steering angle $\beta mP$ and the physical maximum steered angle $\alpha mP$.

Ideally, the steering mechanism 11 is assembled so that the steering center of the steering mechanism 11 ($\alpha=0°$) corresponds to the mechanical center thereof, and the steering angle $\beta=0°$ corresponds to the steered angle $\alpha=0°$, and the steering member 10 may be turned from the steering center to either direction until a steering end is reached. However, as shown in FIG. 4A, the steering column assembly may be assembled at the factory in such a manner that the steering center at which the steering angle $\beta$ is zero ($\beta=0$ position) corresponds to an angular position of the steering member 10 shifted to the left (in counter-clockwise direction) by $\beta 1$ from the mechanical center of the steering member 10 due to a manufacturing/assembly error. Here, $\beta 1$ is required to be smaller than $\beta 0$.

Since the $\beta=0$ position is shifted to the left (in counter-clockwise direction) by $\beta 1$ from the mechanical center of the steering member 10, when the steering member 10 is turned in counter-clockwise direction, the steering angle $\beta$ of the steering member 10 reaches the physical maximum steering angle $\beta mP$ before the steered angle $\alpha$ of the front wheels 3 reaches the physical maximum steered angle $\alpha mP$ on the left side. The maximum steered angle $\alpha mC$ in this case is smaller than the physical maximum steered angle $\alpha mP$ by $\alpha 1$ ($\alpha 1=\beta 1\times K$).

Conversely, when the steering member 10 is turned in clockwise direction, the steered angle of the front wheels 3 reaches the physical maximum steered angle $\alpha mP$ on the right side before the steering angle $\beta$ of the steering member 10 reaches the physical maximum steering angle $\beta mP$. As a result, the rack 26 reaches the rack end, and an impact noise is generated. Furthermore, the angular range of the steered angle $\alpha$ of the front wheels 3 is asymmetric about the steered center (the maximum angular range of the steered angle $\alpha$ to the left is smaller than that to the right by the angle $\alpha 1$). As a result, the left turn cannot be made as sharply as the right turn, and the minimum turning circle of the vehicle 2 is greater in the counter-clockwise turn than in the clockwise turn.

In the present embodiment, the control unit 15 is configured to limit the command to the steering actuator 12 based on the steering angle $\beta$ of the steering member 10 to the control maximum steering angle $\beta mC$ in regard to both the clockwise and counter-clockwise rotations. In other words, even when the steering member 10 is turned beyond the control maximum steering angle $\beta mC$ against the steering limit reaction torque Tsl, the steering actuator 12 does not steer the front wheels 3 beyond the control maximum steered angles $\alpha mC$ which corresponds to the control maximum steering angle $\beta mC$ ($\alpha mC=\beta mC\times K$).

FIG. 4B shows a typical mode of operation of the present embodiment. As shown in FIG. 4B, even when there is a counter-clockwise offset of $\beta 1$ in the steering center of the steering member 10 ($\beta=0°$) relative to the mechanical center, the control maximum steering angle $\beta mC$ can be set by a same angle on each side of the $\beta=0$ position (or in a symmetric manner). Likewise, the control maximum steered angle $\alpha mC$ is set by the same angle on each side of the $\alpha=0$ position (or in a symmetric manner). Since the control maximum steered angle $\alpha mC$ is selected so as to be within the physical maximum steered angle $\alpha mP$ on each side ($\alpha mC < \alpha mP$) and $\beta 1 < \beta 0$, the rack end is never reached so that an impact noise and the deterioration of durability can be avoided. Furthermore, the range of the steered angle $\alpha$ is the same on either side so that the minimum turning radius is the same for both the right turn and the left turn.

It is possible that the steering characteristics of the vehicle 2 may change after the vehicle left the factory, and in such a case, the vehicle 2 may not travel straight ahead even if the steering angle $\beta$ of the steering member 10 is 0°. This could be caused by wearing of the tires and the suspension bushes over time, changing of the tires, and the like. A similar situation may occur when the wheel alignment (toe angle alignment) is incorrectly performed as a part of maintenance work so that the vehicle 2 travels straight ahead when the steering angle $\beta$ is not zero. Further, when there is a cant or a lateral gradient in the road, the vehicle may not travel straight ahead with the steering member 10 at the $\beta=0$ position.

When the yaw rate $\gamma$ is 0 and the lateral acceleration Gy is larger than 0, it is likely that the vehicle 2 is tilted laterally due to the cant of the road surface. In this case, the control unit 15 adjusts the relationship between the steering angle $\beta$ of the steering member 10 and the steered angle $\alpha$ of the front wheels 3 so that the vehicle 2 travels straight ahead with the steering angle $\beta$ maintained at 0°. When the yaw rate $\gamma$ is 0 and the lateral acceleration Gy is also 0, and the vehicle 2 is still steered in either direction with the steering angle $\beta$ maintained at 0°, it is likely that the characteristics of the tire or the suspension have changed, and this has caused the vehicle 2 to swerve in either direction. In this case also, the control unit 15 adjusts the relationship between the steering angle $\beta$ of the steering member 10 and the steered angle $\alpha$ of the front wheels 3 so that the vehicle 2 travels straight ahead with the steering angle $\beta$ maintained at 0°.

To ensure the vehicle 2 to travel straight ahead with the steering member 10 at the $\beta=0$ position even in such situations, the control unit 15 may be configured to alter the relationship between the steering angle $\beta$ and the steered angle $\alpha$ as required. Suppose that the vehicle 2 is traveling straight ahead. This can be determined by detecting that the vehicle speed V is equal to or higher than a predetermined value and the yaw rate $\gamma$ is substantially 0. Then, the signal from the steering angle sensor 21 is corrected so that the $\beta=0$ position of the steering member 10 corresponds to the current steered angle $\alpha$ of the front wheels 3. In other words, when the vehicle 2 is traveling straight ahead, the control unit 15 processes the signal from the steering angle sensor 21 so that the target steered angle $\alpha t$ generated by the control unit 15 coincides with the current steered angle $\alpha$ with the steering member 10 set at the $\beta=0$ position, Thereby, it is ensured that the steering member 10 is at the $\beta=0$ position as long as the vehicle 2 is traveling straight ahead.

FIGS. 5A and 5B are diagrams showing specific examples of the relationship between the steering angle $\beta$ of the steering member 10 and the steered angle $\alpha$ of the front wheels 3. Again, FIG. 5A shows the case where the physical maximum steering angle $\beta mP$ and the physical maximum steered angle $\alpha mP$ are provided, but the control maximum steering angle $\beta mC$ and the control maximum steered angle $\alpha mC$ are not provided. FIG. 5B shows the case where the control maximum steering angle $\beta mC$ and the control maximum steered angle $\alpha mC$ are provided in addition to the physical maximum steering angle $\beta mP$ and the physical maximum steered angle $\alpha mP$.

Referring to FIG. 5A, in this example, the characteristics of the vehicle 2 have changed after the vehicle 2 left the factory or after a maintenance work involving wheel alignment adjustment in such a manner that the front wheels 3 are required to be steered by an angle α2 in order to keep the vehicle 2 traveling straight ahead. This causes discomfort to the driver because the steering member 10 has to be turned by a corresponding angle β2 from the β=0 position for the vehicle 2 to travel straight ahead. Again, it is required that α2〈α0 and β2〈β0.

Therefore, the control unit 15 corrects the relationship between the steering angle β of the steering member 10 and the steered angle α of the front wheels 3 by offsetting the steering center of the steering member 10 at which β=0 to the left from the steered center (for example, mechanical center) set at the factory or after a maintenance work by the angle β2 with the result that the vehicle 2 travels straight ahead with the steering member 10 at the β=0 position as shown in FIG. 5A. When the steering member 10 is turned counter-clockwise, the front wheels 3 are steered to the physical maximum steered angle αmP before the steering angle β reaches the physical maximum steering angle βmP. As a result, the noise is generated at the rack end. Furthermore, even when the rack end is reached, the effective steered angle α (which may be represented by the minimum turning radius) is reduced by the angle α2.

When the steering member 10 is turned clockwise all the way until the physical maximum steering angle βmP is reached, the front wheels 3 are also steered to the physical maximum steered angle αmP. However, the physical maximum steered angle αmP of the front wheels 3 is offset to a position preceding the rack end by an angle α2 due to the correction, and noise at the rack end does not occur.

FIG. 5B shows a typical mode of operation of the present embodiment. In this case also, the control unit 15 corrects the relationship between the steering angle β of the steering member 10 and the steered angle α of the front wheels 3 by offsetting the steering center at which β=0 to the left from the steered center (for example, mechanical center) set at the factory or at the time of maintenance work by the angle β2 with the result that the vehicle 2 travels straight ahead with the steering member 10 at the β=0 position as shown in FIG. 5B. Also, the control maximum steering angle βmC is shifted in the counter-clockwise direction by the angle β2 with respect to the mechanical center of the steering mechanism 11 set at the factory or at the time of maintenance work. Namely, the control maximum steered angle αmC is shifted in the counter-clockwise direction by the angle α2 with respect to the steering center (for example, the mechanical center) of the steering member 10 set at the factory or at the time of maintenance work.

When the steering member 10 is turned counter-clockwise all the way until the control maximum steering angle βmC is reached, the front wheels 3 are also steered to the control maximum steered angles αmC. Since the control maximum steering angle βmC is smaller than physical maximum steered angle αmβ, and the control maximum steered angle αmC is smaller than the physical maximum steered angle αmP, the rack end is not reached, and no impact noise is generated.

When the steering member 10 is turned clockwise all the way until the control maximum steering angle βmC is reached, the front wheels 3 are also steered to the control maximum steered angle αmC. Again, since the control maximum steering angle βmC is smaller than the physical maximum steering angle βmP, and the control maximum steered angle αmC is smaller than physical maximum steered angle αmP, the rack end is not reached, and no impact noise is generated. Furthermore, the angular range of the front wheels 3 is symmetric with respect to the β=0 position so that the minimum turning radius is the same for both the right turn and the left turn.

Figure 6:
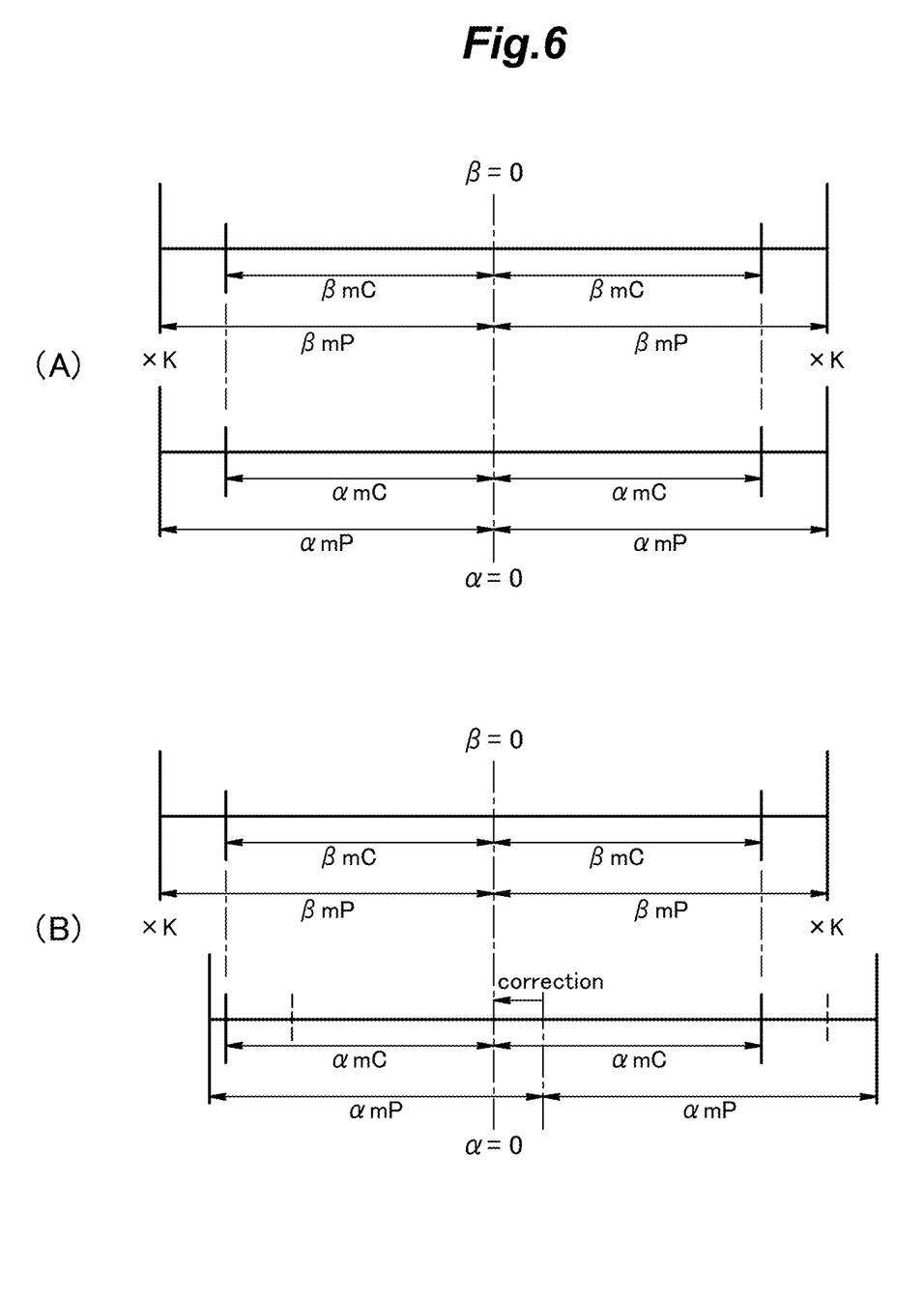
FIGS. 6A and 6B are schematic diagrams illustrating the characteristics of the relationship between the steering angle of a steering member and the steered angle of the front wheels before and after a prescribed correction is made, respectively.

As can be appreciated from the foregoing discussion, in the present embodiment, the control unit 15 corrects the relationship between the target steered angle αt and the steering angle β from the one shown in FIG. 6A to the one shown in FIG. 6B. More specifically, in correcting the relationship between the target steered angle αt and the steering angle β, the control unit 15 sets the control maximum steered angle αmC for the target steered angle αt to the same value for both the steering directions (right and left). As a result, the vehicle 2 can be configured to travel straight ahead when the steering member 10 is at the β=0 position without changing the performance and characteristics of the steering system 1.

Figure 7:
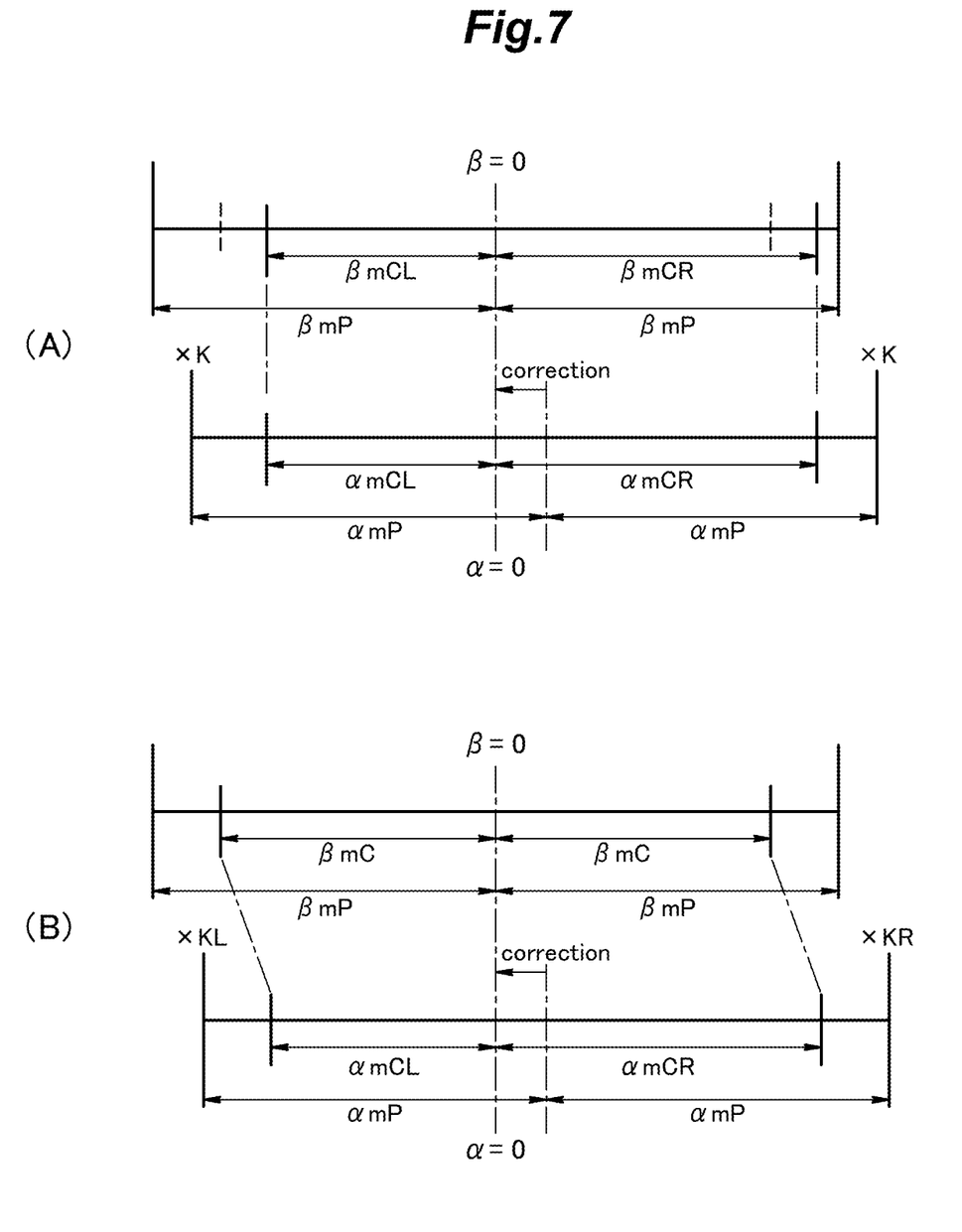
FIGS. 7A and 7B are schematic diagrams illustrating the characteristics of the relationship between the steering angle of a steering member and the steered angle of the front wheels before and after a prescribed correction is made.

FIGS. 7A and 7B show yet other examples of the relationship between the steering angle β and the steered angle α after the correction is made to the original relationship shown in FIG. 6A. In the examples shown in FIGS. 7A and 7B, the control unit 15 changes the value of the control maximum steered angle αmC to individual values for the left turn and the right turn, or to the left control maximum steered angle αmCL and the right control maximum steered angle αmCR, without changing the steered position of the steering mechanism 11 corresponding to the control maximum steered angle αmC which is the limit value of the target steered angle αt for both the right and left turns. As a result, although the performance or characteristics of the steering system 1 may be slightly changed, the vehicle 2 can be made to travel straight ahead when the steering member 10 is located at the β=0 position.

When changing the values of the left and right control maximum steered angle αmC, the control unit 15 can change the control maximum steering angles βmC to individual values, or the left control maximum steering angle βmCL and the right control maximum steering angle βmCR so as to correspond to the change of the left control maximum steered angle αmCL and the right control maximum steered angle αmCR of the target steered angle αt, as shown in FIG. 7A. As a result, the maximum value of the steering angle β and the maximum value of the steered angle α are different on the left and right, and although the performance of the steering system 1 is changed, the steering feel in the angle region before they reach the maximum value is unchanged. However, the above relationship can be corrected.

Alternatively, as shown in FIG. 7B, when changing the values of the left and right control maximum steered angle αmC, the control unit 15 may select the gear ratio K of the steered angle αt to the steering angle β to be different values for the left turn and the right or a left gear ratio KL and a right gear ratio KR, without changing the control maximum steering angle βmC. As a result, even though there may be a slight difference in the way the wheels are steered between the two steering directions (increase/decrease in the steered angle), the prescribed relationship can be corrected without causing a change in the control maximum steering angle βmC in either steering direction. However, the above relationship can be corrected.

The present invention has been described in terms of a specific embodiment, but is not limited by such an embodiment, and can be modified in various ways without departing from the scope of the present invention. For example, in the above embodiment, the control unit 15 was configured to change the relationship between the steering angle β of the steering member 10 and the steered angle α of the front wheels 3 so that the vehicle 2 travels straight ahead with the steering angle β maintained at 0°. This can be performed at the factory or the shop so that the prescribed relationship is changed, and kept fixed permanently or for a prolonged period of time. Alternatively, this can be performed on a real time basis so that the relationship may be corrected in response to the change in the road condition. For instance, according to the outputs from the speed, the yaw rate γ, and the lateral acceleration Gy of the vehicle 2, the control unit 15 may adjust the relationship as discussed above.

Also, the specific configuration, arrangement, quantity, angle, procedure, and the like of each member and part can be appropriately changed without deviating from the gist of the present invention. Further, all of the components shown in the above embodiments are not necessarily essential to the present invention, and can be appropriately selected and omitted without departing from the gist of the present invention.

REFERENCE SIGNS LIST

1: steering system 2: vehicle
3: front wheel 10: steering member
11: steering mechanism 12: steering actuator
13: reaction force actuator
15: control unit
19: steering wheel
18: steering shaft
20: steering column 21: steering angle sensor
32: steering steered angle sensor 43: physical stopper
α: steered angle αt: target steered angle
αmP: physical maximum steered angle αmC: control maximum steered angle
β: steering angle βmP: physical maximum steering angle
βmC: control maximum steering angle γ: yaw rate
T: reaction torque Tsl: steering limit reaction torque
Tt: target reaction torque

The invention claimed is:

1. A steering system for a vehicle, comprising:
a steering member configured to receive a steering operation;
a steering mechanism mechanically separated from the steering member and including a rack that steers wheels via a movement thereof;
a steering angle sensor that detects a steering angle of the steering member;
a steered angle sensor that detects a steered angle of the wheels;
a steering actuator configured to provide a drive force to the steering mechanism;
a reaction force actuator configured to apply a reaction force to the steering member in response to the steering operation; and
a control unit configured to determine a target steered angle according to the steering angle and drive the steering actuator so as to cause the steered angle to coincide with the target steered angle, and to determine a target reaction force according to a steered state of the wheels and drive the reaction force actuator so as to cause the reaction force to coincide with the target reaction force,
wherein the control unit is configured to set a control maximum steered angle on the target steered angle, the control maximum steered angle being a value smaller than a physical maximum steered angle of the wheels imposed by the steering mechanism,
wherein the control unit is configured to generate a steering limit reaction force that defines a maximum steering control limit angle of the steering member corresponding to the control maximum steered angle, and
wherein the steering system further comprises a physical stopper that defines a physical maximum steering angle of the steering member, the physical maximum steering angle corresponding to the physical maximum steered angle, and the maximum steering control limit angle being smaller than the physical maximum steering angle.

2. The steering system for a vehicle according to claim 1, wherein when the steered angle deviates from zero degree although the vehicle is traveling straight ahead, the control unit is configured to correct the prescribed relationship such that the current target steered angle corresponds to a zero degree position of the steering member.

3. The steering system for a vehicle according to claim 2, wherein the control unit determines that the vehicle is traveling straight ahead according to a yaw rate of the vehicle.

4. The steering system for a vehicle according to claim 2, wherein the control unit is configured to correct the prescribed relationship such that the control maximum steered angle is a same value in both steering directions.

5. A steering system for a vehicle, comprising:
a steering member configured to receive a steering operation;
a steering mechanism mechanically separated from the steering member and including a rack that steers wheels via a movement thereof;
a steering angle sensor that detects a steering angle of the steering member;
a steered angle sensor that detects a steered angle of the wheels;
a steering actuator configured to provide a drive force to the steering mechanism;
a reaction force actuator configured to apply a reaction force to the steering member in response to the steering operation; and
a control unit configured to determine a target steered angle according to the steering angle and drive the steering actuator so as to cause the steered angle to coincide with the target steered angle, and to determine a target reaction force according to a steered state of the wheels and drive the reaction force actuator so as to cause the reaction force to coincide with the target reaction force,
wherein the control unit is configured to set a control maximum steered angle on the target steered angle, the control maximum steered angle being a value smaller than a physical maximum steered angle of the wheels imposed by the steering mechanism,
wherein when the steered angle deviates from zero degree although the vehicle is traveling straight ahead, the control unit is configured to correct the prescribed relationship such that the current target steered angle corresponds to a zero degree position of the steering member, and
wherein the control unit is configured to correct the prescribed relationship such that the control maximum steered angle in left steering direction is changed to a predetermined value and the control maximum steered angle in right steering direction is changed to a value different from the predetermined value without changing steered positions of the steering mechanism corresponding to the control maximum steered angles in both steering directions.

6. The steering system for a vehicle according to claim 5, wherein in changing the control maximum steered angles in both steering directions, the control unit changes the prescribed relationship in such a manner that the control maximum steering angles in both steering directions are changed to individual values so as to correspond to changes in the control maximum steered angles.

7. The steering system for a vehicle according to claim 5, wherein in changing the control maximum steered angles in both steering directions, the control unit changes the prescribed relationship in such a manner that a gear ratio of the steered angle of the steered wheels to the steering angle of the steering member is changed differently between the two steering directions without changing the control maximum steering angle of the steering member.

\* \* \* \* \*